United States Patent [19]
Suh et al.

[11] Patent Number: 5,631,712
[45] Date of Patent: May 20, 1997

[54] CDP-INCORPORATED TELEVISION RECEIVER

[75] Inventors: Moon-hwan Suh, Seoul; Jang-earn Leim, Suwon, both of Rep. of Korea

[73] Assignee: Samsung Electronics Co., Ltd., Kyungki-do, Rep. of Korea

[21] Appl. No.: 468,922

[22] Filed: Jun. 6, 1995

[30]  Foreign Application Priority Data

Mar. 28, 1995 [KR] Rep. of Korea .................. 95-6754

[51] Int. Cl.$^6$ .................................................. H04N 5/268
[52] U.S. Cl. ...................... 348/705; 348/552; 348/725; 84/634; 369/47; 369/273; 369/69
[58] Field of Search ........................ 348/706, 705, 348/96, 725, 726, 734, 553, 552; 358/335; 369/15, 47, 69, 273; 360/32, 61, 48; 84/601, 602, 610, 634, 645; 364/410; 463/43, 31, 35; H04N 5/268

[56]  References Cited

U.S. PATENT DOCUMENTS

| | | | |
|---|---|---|---|
| 5,034,818 | 7/1991 | Baik-Hee | 348/706 |
| 5,341,178 | 8/1994 | Ebihara et al. | 348/705 |
| 5,437,464 | 8/1995 | Terasima et al. | 463/31 |
| 5,464,946 | 11/1995 | Lewis | 84/645 |
| 5,496,178 | 3/1996 | Back | 348/725 |
| 5,506,690 | 4/1996 | Kim | 348/705 |

*Primary Examiner*—John K. Peng
*Assistant Examiner*—Jeffrey S. Murrell
*Attorney, Agent, or Firm*—Sughrue, Mion, Zinn, Macpeak & Seas

[57]  ABSTRACT

A CDP-incorporated television receiver is provided which includes a CD reproducer, a CDG processor, a CDV processor, and a CD-OK processor. The CD reproducer reads data from an optical disk, and the CDG, CDV, and CD-OK processors input such data and respectively produce corresponding RGB, synchronization, and other signals, which respectively correspond to CD-graphics, CD-video, and CD-OK. A CD controller also receives a data signal from said CD reproducer, and determines the type of compact disk currently being reproduced by the CD reproducer based on the data signal. As a result, the CD controller produces a selection signal corresponding to the type of compact disk and outputs the selection signal to a switching matrix. The switching matrix selectively outputs one group of RGB, synchronization, and other signals based on the selection signal to an encoder, and the encoder converts the selected RGB signal into a CD video signal. The CDP-incorporated television receiver also contains a TV receiver which receives a TV video signal and a TV controller which generates a selection signal in accordance with a CD/TV selection command. A switching circuit selectively outputs, in response to the selection signal, either the CD video signal output from the encoder or the TV video signal output from the TV receiver as a selected video signal. Finally, a video processor processes the selected video signal and displays the selected video signal.

25 Claims, 2 Drawing Sheets

CDP-INCORPORATED TELEVISION RECEIVER

FIELD OF THE INVENTION

The present invention relates to a compact disk player (CDP) which is incorporated into a television receiver. More particularly, the present invention relates to a device produced by incorporating a compact disk song accompaniment apparatus into a television receiver.

BACKGROUND OF THE INVENTION

A compact disk song accompaniment apparatus (CD-OK apparatus) is a device which stores thousands of songs, lyrical data, and background picture images. When a particular song is selected for reproduction, the CD-OK apparatus is capable of displaying picture images and/or lyrics which correspond to the selected song. In general, a CD-OK apparatus can store lyrics for about 2,000 songs and about 4,000 still screen images on one compact disk.

Also, a karaoke TV receiver is a device which also stores many songs, lyrical data, and graphic images. However, the karaoke TV receiver stores the above data in a semiconductor memory instead of a compact disk. As a result, the storage capacity of a karaoke TV receiver has about one fifth the storage capacity of a CD-OK apparatus and is capable of only storing about 400 songs and scores of graphic images. Moreover, the karaoke TV receiver functions as a karaoke parlor with compact disk graphics (CDG) level capability.

In a CD-OK apparatus which has no display unit, the reproduced video signal is supplied to an external video connector jack of a TV receiver via audio and video output ports. Thus, the video signal is displayed on the TV receiver and the audio signal is output to a speaker. Since external connections must be made between the TV receiver and the CD-OK apparatus, connecting the CD-OK apparatus to a TV receiver is inconvenient.

On the other hand, the karaoke TV receiver is incorporated with a TV set, and thus, is more convenient in some aspects than a CD-OK apparatus having no display unit. However, since the memory capacity of a karaoke TV receiver is about one fifth that of the CD-OK apparatus, only a few background graphic screens can be accommodated.

Also, a variety of compact disk types are currently available on the market, such as CD-digital audio disks, CD-graphics disks, and CD-video disks. Since each disk has its own particular format, each disk can only be reproduced from a CD player which is specifically produced for each of the disks above. As a result, in order to reproduce each type of disk, separate CD players are required, thus increasing the cost of developing a completely compatible reproduction system.

Moreover, as the number of separate CD players increases, the amount of space needed for installation and the number of unsightly external connections likewise increase. Furthermore, since each CD player is generally provided with its own exclusive remote controller, a greater number of remote controllers are required to operate the reproduction system.

SUMMARY OF THE INVENTION

In order to solve the above problems, a compact disk player (CDP) incorporated television receiver is provided.

In one embodiment of the present invention, the CDP-incorporated television receiver comprises: a CD reproducer for reading and processing data from a compact disk and for generating compact disk data signals; a CDG processor for extracting subcode data from the compact disk data signals and for generating a first RGB signal, a first synchronization signal, and a first chrominance subcarrier signal, which correspond to a compact disk graphics; a CDV processor for receiving the compact disk data signals and for generating a second RGB signal, a second synchronization signal, and a second chrominance subcarrier signal, which correspond to a compact disk video; a CD-OK processor for receiving the compact disk data signals and for generating a third RGB signal, a third synchronization signal, and a third chrominance subcarrier signal, which correspond to a compact disk song accompaniment; a CD controller for receiving a data signal from the CD reproducer, for discriminating a type of compact disk currently being reproduced based on the data signal, and for generating a first selection signal corresponding to the type of compact disk; a switching matrix for selectively outputting, in response to the first selection signal, either the first RGB signal, the first synchronization signal, and the first chrominance subcarrier signal, or the second RGB signal, the second synchronization signal, and the second chrominance subcarrier signal as a selected RGB signal, a selected synchronization signal, and a selected chrominance subcarrier signal; an encoder for receiving the selected RGB signal, the selected synchronization signal, and the selected chrominance subcarrier signal from the switching matrix and converting the selected RGB signal into a CD video signal; a TV receiver for receiving a TV signal of a tuned channel and for outputting a corresponding TV video signal; a TV controller for generating a second selection signal in accordance with a CD/TV selection command; a switching circuit for selectively outputting, in response to the second selection signal, either the CD video signal output from the encoder or the TV video signal output from the TV receiver as a selected video signal; and a video processor for processing the selected video signal and displaying the video signal on a monitor.

In another embodiment of the present invention, the CDP-incorporated television receiver comprises: a CD reproducer for reading and processing data from a compact disk and for generating compact disk data signals; a CDG processor for extracting subcode data from the compact disk data signals and for generating a first RGB signal, a first synchronization signal, and a first blanking signal, which correspond to a compact disk graphics; a CDV processor for receiving the compact disk data signals and for generating a second RGB signal, a second synchronization signal, and a second blanking signal, which correspond to a compact disk video; a CD-OK processor for receiving the compact disk data signals and for generating a third RGB signal, a third synchronization signal, and a third blanking signal, which correspond to a compact disk song accompaniment; a CD controller for receiving a data signal from the CD reproducer, for discriminating a type of compact disk currently being reproduced based on the data signal, and for generating a first selection signal corresponding to the type of compact disk; a first switching matrix for selectively outputting, in response to the first selection signal, the first RGB, synchronization, and blanking signals, the second RGB, synchronization, and blanking signals, or the third RGB, synchronization, and blanking signals as selected RGB, synchronization, and blanking signals; a TV receiver for receiving a TV signal of a tuned channel and outputting a corresponding TV video signal; a TV controller for generating a second selection signal in accordance with a CD/TV selection command; a switching circuit for selectively outputting, in response to the second selection signal, either the selected synchronization signal output from the first switching matrix or the TV video signal output from the TV receiver; a video processor for processing the TV video signal selected by the switching circuit to generate a TV RGB signal and for generating vertical and horizontal synchronization signals; and a second switching matrix for selectively outputting, in response to the selected blanking signal output from the first switching matrix, either the TV RGB signal output from the switching circuit or the selected RGB signal output from the first switching matrix as an output RGB signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
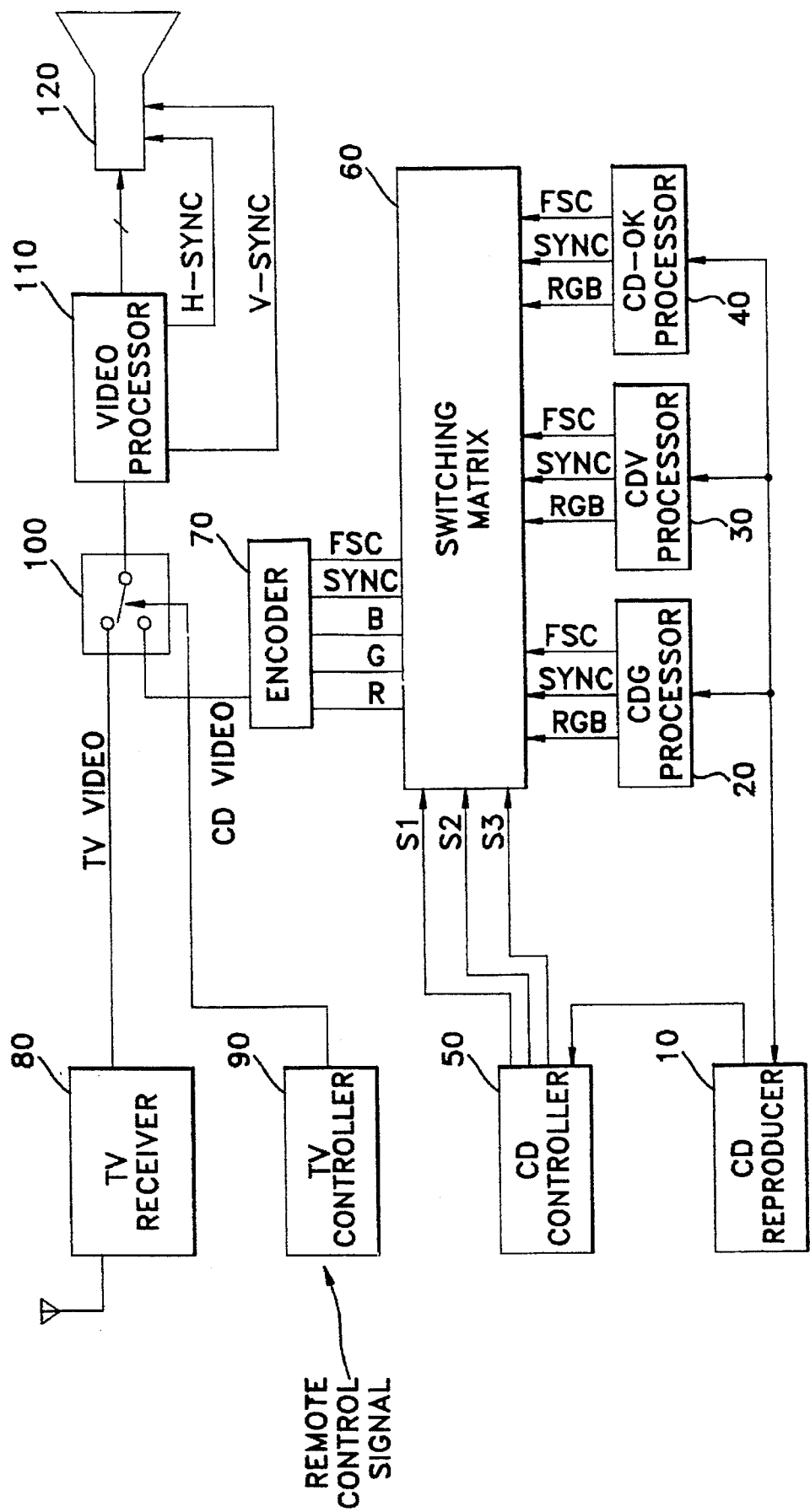
FIG. 1 is a block diagram of a CDP-incorporated television receiver according to an embodiment of the present invention.

One embodiment of a CDP-incorporated television receiver is illustrated in FIG. 1. As shown in the figure, the CDP-incorporated television receiver includes a CD reproducer 10, a CD-graphics (CDG) processor 20, a CD-video (CDV) processor 30, and a CD-OK processor 40.

The CD reproducer 10 reads data from a compact disk via an optical pickup, and amplifies the data via a high frequency amplifier (not shown). Subsequently, the amplified signal is input to a digital-signal processing unit (not shown) in which the amplified signal is demodulated and/or error corrected. Afterwards the digital-signal processing unit outputs compact disk data signals which correspond to the amplified signal.

The CDG processor 20 inputs the compact disk data signals and extracts subcode data from the compact disk data signals. Subsequently, the CDG processor 20 generates an RGB signal, a synchronization signal (SYNC), and a chrominance subcarrier signal (FSC) for a CD-graphics based on the subcode data. Similarly, the CDV processor 30 and the CD-OK processor 40 respectively receive compact disk data signals from the CD reproducer 10 and generate RGB signals, synchronization signals, and chrominance subcarrier signals for a CD-video and a CD-OK.

The CDP-incorporated television receiver also contains a CD controller 50 which inputs signals from the CD reproducer 10. The CD controller 50 discriminates whether the disk currently being reproduced by the CD reproducer 10 is a CD-graphic, a CD-video, or a CD-OK. After determining the type of disk, the CD controller 50 generates a selection signal S1, S2, or S3 corresponding to the type of disk and outputs the selection signal S1, S2, or S3 to a switching matrix 60.

The switching matrix 60 inputs the RGB signals, synchronization signals, and chrominance subcarrier signals from the CDG processor 20, the CDV processor 30, and the CD-OK processor 40, as well as a selection signal S1, S2, or S3 from the CD controller 50. Depending on the selection signal S1, S2, or S3, the switching matrix 60 selectively outputs the RGB signal, synchronization signal, and chrominance subcarrier signal which correspond to the type of disk being reproduced in the CD reproducer 10.

The signals output from the switching matrix 60 are input by an encoder 70 which converts the received RGB signal into a CD video signal according to the NTSC method. The CD video signal is then output to a switching circuit 100.

The CDP-incorporated television receiver also comprises a TV receiver 80 which receives a TV video signal corresponding to the channel at which a tuner of the TV receiver 80 is tuned. Subsequently, the TV video signal is demodulated by a demodulator (not shown) and output to the switching circuit 100.

A TV controller 90 generates a selection signal and outputs such signal to the switching circuit 100 in accordance with a CD/TV selection command generated by a remote control signal. Based on the selection signal, the switching circuit 100 selectively outputs the CD video signal output from the encoder 70 or the TV video signal output from the TV receiver 80.

A video processor 110 inputs the selected video signal and separates the selected video signal into a luminance signal and a chrominance signal. Subsequently, the separated luminance and chrominance signals are converted into an RGB signal through a matrix circuit (not shown), and the RGB signal is supplied to a monitor 120. Then, the RGB signal is displayed on the monitor 120 in accordance with vertical and horizontal synchronization signals (V-SYNC and H-SYNC).

The selection signals S1, S2, and S3 are generated by the CD controller 50 as illustrated in the following table 1.

TABLE 1

| Disk type | Selection signal (S1, S2, S3) | Outputs of switching matrix |
| --- | --- | --- |
| CDG | 0, 0, 1 | RGB, SYNC and FSC for CDG |
| CDV | 0, 1, 0 | RGB, SYNC and FSC for CDV |
| CD-OK | 1, 0, 0 | RGB, SYNC and FSC for CD-OK |

According to the present embodiment, the video signal for the TV receiver 80 is converted into a luminance signal and a chrominance signal, while the video signal for the CD player is processed into an RGB signal. Therefore, the CD video signal of the CD player is processed in accordance with the video signal processing method of the TV video signal of the TV receiver 80. Also, since a switching matrix and an NTSC encoder are utilized, the burden of converting the RGB signal into a video signal by using a NTSC television method for each CD processor 20, 30 and 40 is eliminated. Thus, the circuit configuration becomes simplified and the cost is reduced. In other words, the present embodiment reduces the necessary modifications to the TV circuit and facilitates the connection of the CD player to TV circuit.

Figure 2:
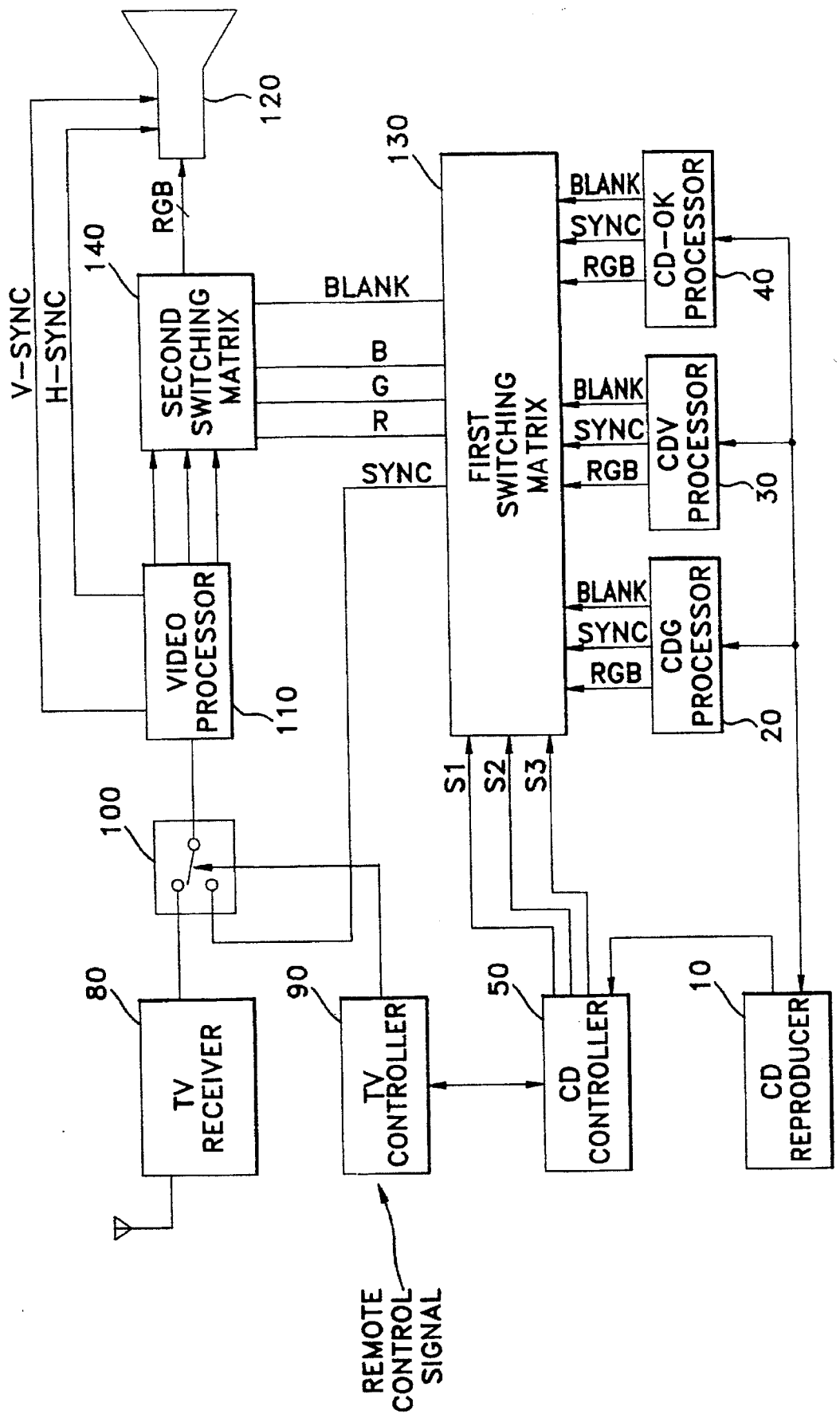
FIG. 2 is a block diagram of a CDP-incorporated television receiver according to another embodiment of the present invention.

Another embodiment of a CDP-incorporated television receiver is illustrated in FIG. 2. The components illustrated in FIG. 2 which correspond to the same components shown in FIG. 1 are designated by the same numerals.

As shown FIG. 2, the CDP-incorporated television receiver includes a CD reproducer 10, a CDG processor 20, a CDV processor 30, and a CD-OK processor 40.

The CD reproducer 10 reads data from a compact disk via an optical pickup, and amplifies the data via a high frequency amplifier (not shown). Subsequently, the amplified signal is input to a digital-signal processing unit (not shown) in which the amplified signal is demodulated and/or error corrected. Afterwards the digital-signal processing unit outputs compact disk data signals which correspond to the amplified signal.

The CDG processor 20 inputs the compact disk data signals and extracts subcode data from the compact disk data signals. Subsequently, the CDG processor 20 generates an RGB signal, a synchronization signal (SYNC), and a blanking signal (BLANK) for a CD-graphics based on the subcode data. Similarly, the CDV processor 30 and the CD-OK processor 40 respectively receive compact disk data signals from the CD reproducer 10 and generate RGB signals, synchronization signals, and blanking signals for a CD-video and a CD-OK.

The CDP-incorporated television receiver also contains a CD controller 50 which inputs signals from the CD reproducer 10. The CD controller 50 discriminates whether the disk currently being reproduced by the CD reproducer 10 is a CD-graphic, a CD-video, or a CD-OK. After determining the type of disk, the CD controller 50 generates a selection signal S1, S2, or S3 corresponding to the type of disk and outputs the selection signal S1, S2, or S3 to a first switching matrix 130.

Depending on the values of the selection signals S1, S2, and S3, the first switching matrix 130 inputs the RGB signal, synchronization signal, and blanking signal from the CDG processor 20, the CDV processor 30, or the CD-OK processor 40. Subsequently, the first switching matrix 130 selectively outputs the RGB signal, synchronization signal, and blanking signal corresponding to the type of disk being reproduced in the CD reproducer 10. The RGB signal and blanking signal are output to a second switching matrix 140, and the synchronization signal is output to a switching circuit 100.

The CDP-incorporated television receiver also comprises a TV receiver 80 which receives a TV video signal corresponding to the channel at which the tuner is tuned. Subsequently, the TV video signal is demodulated by a demodulator (not shown) and output to the switching circuit 100.

A TV controller 90 generates and outputs a selection signal to the switching circuit 100 in accordance with a CD/TV selection command generated by a remote control signal. Based on the selection signal, the switching circuit 100 selectively outputs the synchronization signal output from the first switching matrix 130 or the TV video signal output from the TV receiver 80.

A video processor 110 inputs either the synchronization signal or the TV video signal output from the switching circuit 100. If the TV video signal is input, the video processor 110 separates the video signal into a luminance signal and a chrominance signal. Subsequently, the separated luminance and chrominance signals are converted into an RGB signal through a matrix circuit (not shown), and the RGB signal is supplied to the second switching matrix 140. Then, the video processor 110 supplies vertical and horizontal synchronization signals (V-SYNC and H-SYNC) to a monitor 120 in accordance with the RGB signals.

The second switching matrix 140 inputs the blanking signal from the first switching matrix 130 and selectively inputs the RGB signals from the video processor 110 or the RGB signals from the first switching matrix 130 based on the blanking signal. Subsequently, the selected RGB signal is output to the monitor 120 to be displayed. Since the second switching matrix 140 selectively inputs the RGB signal corresponding to the TV video signal or RGB signal corresponding to CD video signal in response to the blanking signal, the TV screen of the monitor 120 can be quickly and easily overlaid with the screen reproduced from the compact disk.

In contrast to the embodiment illustrated in FIG. 1, the present embodiment selects the RGB signal such that the NTSC encoder is not necessary. Moreover, since the RGB signal reproduced from a compact disk is not converted to luminance and chrominance signals by an NTSC method and then converted back into an RGB signal to be displayed on the monitor 120, the amount of noise which is generated in the displayed signal is significantly reduced, and the picture quality of the displayed signal is substantially enhanced. In other words, since the RGB signals output from the CDP are displayed without being extensively processed, the modification of the CDP is minimized. Therefore, in order to integrate the CDP and the TV, the RGB switching circuit for a TV receiver merely has to be added.

As described above, according to the present invention, video signals for a CDP-incorporated television receiver are easily switched between the CDP and the TV receiver. As a result, the configuration of the device is simplified, the cost of the device is reduced, and the picture quality of the device is improved.

What is claimed is:

1. A compact disk player (CDP) incorporated television receiver comprising:

a CD reproducer for reading and processing data from a compact disk and for generating compact disk data signals;

a first processor for extracting subcode data from said compact disk data signals and for generating a first RGB signal, a first synchronization signal, and a first chrominance subcarrier signal, which correspond to a first type of compact disk;

a second processor for receiving said compact disk data signals and for generating a second RGB signal, a second synchronization signal, and a second chrominance subcarrier signal, which correspond to a second type of compact disk;

a CD controller for receiving a data signal from said CD reproducer, for discriminating a type of compact disk currently being reproduced based on said data signal, and for generating a first selection signal corresponding to said type of compact disk;

a switching matrix for selectively outputting, in response to said first selection signal, either said first RGB signal, said first synchronization signal, and said first chrominance subcarrier signal or said second RGB signal, said second synchronization signal, and said second chrominance subcarrier signal as a selected RGB signal, a selected synchronization signal, and a selected chrominance subcarrier signal; and an encoder for receiving said selected RGB signal, said selected synchronization signal, and said selected chrominance subcarrier signal from said switching matrix and converting said selected RGB signal into a CD video signal.

2. The CDP-incorporated television receiver according to claim 1, further comprising:

a third processor for receiving said compact disk data signals and generating a third RGB signal, a third synchronization signal, and a third chrominance subcarrier signal, which correspond to a third type of compact disk, wherein said switching matrix selectively outputs, in response to said first selection signal, said first RGB, synchronization, and chrominance subcarrier signals, said second RGB, synchronization, and chrominance subcarrier signals, or said third RGB, synchronization, and chrominance subcarrier signals as said selected RGB, synchronization, and chrominance subcarrier signals.

3. The CDP-incorporated television receiver according to claim 2, wherein said first processor is a CDG processor and said first type of compact disk is a compact disk graphics, wherein said second processor is a CDV processor and said second type of compact disk is a compact disk video, and wherein said third processor is a CD-OK processor and said third type of compact disk is a (song accompaniment compact disk CD-OK).

4. The CDP-incorporated television receiver according to claim 3, further comprising:
a TV receiver for receiving a TV signal of a tuned channel and for outputting a corresponding TV video signal;
a TV controller for generating a second selection signal in accordance with a CD/TV selection command;
a switching circuit for selectively outputting, in response to said second selection signal, either said CD video signal output from said encoder or said TV video signal output from said TV receiver as a selected video signal; and
a video processor for processing said selected video signal and displaying said selected video signal on a monitor.

5. The CDP-incorporated television receiver according to claim 4, wherein said first processor is a CDG processor and said first type of compact disk is a compact disk graphics, wherein said second processor is a CDV processor and said second type of compact disk is a compact disk video, and wherein said third processor is a CD-OK processor and said third type of compact disk is a song accompaniment compact disk (CD-OK).

6. The CDP-incorporated television receiver according to claim 1, further comprising:
a TV receiver for receiving a TV signal of a tuned channel and for outputting a corresponding TV video signal;
a TV controller for generating a second selection signal in accordance with a CD/TV selection command;
a switching circuit for selectively outputting, in response to said second selection signal, either said CD video signal output from said encoder or said TV video signal output from said TV receiver as a selected video signal; and
a video processor for processing said selected video signal and displaying said selected video signal on a monitor.

7. The CDP-incorporated television receiver according to claim 1, wherein said first processor is a CDG processor and said first type of compact disk is a compact disk graphics and wherein said second processor is a CDV processor and said second type of compact disk is a compact disk video.

8. The CDP-incorporated television receiver according to claim 1, wherein said first processor is a CDV processor and said first type of compact disk is a compact disk video and wherein said second processor is a CD-OK processor and said second type of compact disk is a song accompaniment compact disk (CD-OK).

9. The CDP-incorporated television receiver according to claim 1, wherein said first processor is a CD-OK processor and said first type of compact disk is song accompaniment compact disk (CD-OK) and wherein said second processor is a CDG processor and said second type of compact disk is a compact disk graphics.

10. A compact disk player (CDP) incorporated television receiver comprising:

a CD reproducer for reading and processing data from a compact disk and for generating compact disk data signals;
a first processor for extracting subcode data from said compact disk data signals and for generating a first RGB signal, a first synchronization signal; and a first blanking signal, which correspond to a first type of compact disk;
a second processor for receiving said compact disk data signals and for generating a second RGB signal, a second synchronization signal, and a second blanking signal, which correspond to a second type of compact disk;
a CD controller for receiving a data signal from said CD reproducer, for discriminating a type of compact disk currently being reproduced based on said data signal, and for generating a first selection signal corresponding to said type of compact disk; and
a first switching matrix for selectively outputting, in response to said first selection signal, either said first RGB signal, said first synchronization signal, and said first blanking signal or said second RGB signal, said second synchronization signal, and said second blanking signal as a selected RGB signal, a selected synchronization signal, and a selected blanking signal.

11. The CDP-incorporated television receiver according to claim 10, further comprising:
a third processor for receiving said compact disk data signals and generating a third RGB signal, a third synchronization signal, and a third blanking signal, which correspond to a third type of compact disk,
wherein said first switching matrix selectively outputs, in response to said first selection signal, said first RGB, synchronization, and blanking signals, said second RGB, synchronization, and blanking signals, or said third RGB, synchronization, and blanking signals as said selected RGB, synchronization, and blanking signals.

12. The CDP-incorporated television receiver according to claim 11, wherein said first processor is a CDG processor and said first type of compact disk is a compact disk graphics, wherein said second processor is a CDV processor and said second type of compact disk is a compact disk video, and wherein said third processor is a CD-OK processor and said third type of compact disk is a song accompaniment compact disk (CD-OK).

13. The CDP-incorporated television receiver according to claim 11, further comprising:
a TV receiver for receiving a TV video signal of a tuned channel and for outputting a corresponding TV video signal;
a TV controller for generating a second selection signal in accordance with a CD/TV selection command;
a switching circuit for selectively outputting, in response to said second selection signal, either said selected synchronization signal output from said first switching matrix or said TV video signal output from said TV receiver;
a video processor for processing said TV video signal selected by said switching circuit to generate a TV RGB signal and for generating vertical and horizontal synchronization signals; and
a second switching matrix for selectively outputting, in response to said selected blanking signal output from said first switching matrix, either said TV RGB signal output from said switching circuit or said selected RGB signal output from said first switching matrix as an output RGB signal.

14. The CDP-incorporated television receiver according to claim 13, wherein said first processor is a CDG processor and said first type of compact disk is a compact disk graphics, wherein said second processor is a CDV processor and said second type of compact disk is a compact disk video, and wherein said third processor is a CD-OK processor and said third type of compact disk is a song accompaniment compact disk (CD-OK).

15. The CDP-incorporated television receiver according to claim 14, further comprising:

a monitor for receiving and displaying said output RGB signal.

16. The CDP-incorporated television receiver according to claim 10, further comprising:

a TV receiver for receiving a TV video signal of a tuned channel and for outputting a corresponding TV video signal;

a TV controller for generating a second selection signal in accordance with a CD/TV selection command;

a switching circuit for selectively outputting, in response to said second selection signal, either said selected synchronization signal output from said first switching matrix or said TV video signal output from said TV receiver;

a video processor for processing said TV video signal selected by said switching circuit to generate a TV RGB signal and for generating vertical and horizontal synchronization signals; and a second switching matrix for selectively outputting, in response to said selected blanking signal output from said first switching matrix, either said TV RGB signal output from said switching circuit or said selected RGB signal output from said first switching matrix as an output RGB signal.

17. The CDP-incorporated television receiver according to claim 10, wherein said first processor is a CDG processor and said first type of compact disk is a compact disk graphics and wherein said second processor is a CDV processor and said second type of compact disk is a compact disk video.

18. The CDP-incorporated television receiver according to claim 10, wherein said first processor is a CDV processor and said first type of compact disk is a compact disk video and wherein said second processor is a CD-OK processor and said second type of compact disk is a song accompaniment compact disk (CD-OK).

19. The CDP-incorporated television receiver according to claim 10, wherein said first processor is a CD-OK processor and said first type of compact disk is a song accompaniment compact disk (CD-OK) and wherein said second processor is a CDG processor and said second type of compact disk is a compact disk graphics.

20. A compact disk player (CDP) incorporated television receiver comprising:

a CD reproducer for reading and processing data from a compact disk and for generating a compact disk data signal;

a first processor for receiving said compact disk data signal and for generating a first output signal which corresponds to a first type of compact disk;

a second processor for receiving said compact disk data signal and for generating a second output signal which corresponds to a second type of compact disk;

a CD controller for receiving a data signal from said CD reproducer, for discriminating a type of compact disk currently being reproduced based on said data signal, and for generating a first selection signal corresponding to said type of compact disk; and a switching matrix for selectively outputting, in response to said first selection signal, either said first output signal or said second output signal as a selected output signal.

21. The CDP-incorporated television receiver according to claim 20, further comprising:

a third processor for receiving said compact disk data signal and generating a third output signal which corresponds to a third type of compact disk, wherein said switching matrix selectively outputs, in response to said first selection signal, said first output signal, said second output signal, or said third output signal.

22. The CDP-incorporated television receiver according to claim 21, wherein said first processor is a CDG processor and said first type of compact disk is a compact disk graphics, wherein said second processor is a CDV processor and said second type of compact disk is a compact disk video, and wherein said third processor is a CD-OK processor and said third type of compact disk is a song accompaniment compact disk (CD-OK).

23. The CDP-incorporated television receiver according to claim 20, wherein said first processor is a CDG processor and said first type of compact disk is a compact disk graphics and wherein said second processor is a CDV processor and said second type of compact disk is a compact disk video.

24. The CDP-incorporated television receiver according to claim 20, wherein said first processor is a CDV processor and said first type of compact disk is a compact disk video and wherein said second processor is a CD-OK processor and said second type of compact disk is a song accompaniment compact disk (CD-OK).

25. The CDP-incorporated television receiver according to claim 20, wherein said first processor is a CD-OK processor and said first type of compact disk is a song accompaniment compact disk (CD-OK) and wherein said second processor is a CDG processor and said second type of compact disk is a compact disk graphics.

* * * * *